United States Patent
Mayer

(10) Patent No.: US 10,456,913 B2
(45) Date of Patent: Oct. 29, 2019

(54) METHOD AND APPARATUS FOR CONTROLLING A ROBOT MOVEMENT OF A ROBOT ON THE BASIS OF A SECOND TRAJECTORY

(71) Applicant: SIEMENS AKTIENGESELLSCHAFT, München (DE)

(72) Inventor: Hermann Georg Mayer, Prien am Chiemsee (DE)

(73) Assignee: SIEMENS AKTIENGESELLSCHAFT (DE)

( * ) Notice: Subject to any disclaimer, the term of this patent is extended or adjusted under 35 U.S.C. 154(b) by 148 days.

(21) Appl. No.: 15/647,350

(22) Filed: Jul. 12, 2017

(65) Prior Publication Data

US 2018/0015615 A1    Jan. 18, 2018

(30) Foreign Application Priority Data

Jul. 14, 2016 (DE) .................. 10 2016 212 911

(51) Int. Cl.
| | | |
|---|---|---|
| *B25J 9/10* | (2006.01) | |
| *B25J 9/16* | (2006.01) | |
| *G05B 19/4155* | (2006.01) | |
| *G05B 19/25* | (2006.01) | |
| *G05B 19/31* | (2006.01) | |

(52) U.S. Cl.
CPC .............. *B25J 9/1664* (2013.01); *B25J 9/10* (2013.01); *G05B 19/256* (2013.01); *G05B 19/316* (2013.01); *G05B 19/4155* (2013.01)

(58) Field of Classification Search
CPC ....... B25J 9/10; B25J 9/1664; G05B 19/4155; G05B 19/316; G05B 19/256
See application file for complete search history.

(56) References Cited

U.S. PATENT DOCUMENTS

| | | | | |
|---|---|---|---|---|
| 4,860,215 A | * | 8/1989 | Seraji ................. | B25J 9/163 700/260 |
| 5,129,044 A | * | 7/1992 | Kashiwagi ............ | B25J 9/1633 700/251 |
| 5,497,061 A | * | 3/1996 | Nonaka ................. | B25J 9/1633 318/568.1 |
| 2009/0063597 A1 | * | 3/2009 | Sono ................... | G06F 17/13 708/102 |
| 2009/0125146 A1 | * | 5/2009 | Zhang .................. | B25J 9/1664 700/253 |
| 2010/0286826 A1 | * | 11/2010 | Tsusaka ................ | B25J 9/1633 700/254 |
| 2011/0093120 A1 | * | 4/2011 | Ando ................... | B25J 9/1638 700/260 |
| 2012/0004806 A1 | * | 1/2012 | Hozumi ................ | B60G 17/08 701/37 |
| 2013/0184869 A1 | * | 7/2013 | Inazumi ............... | B25J 9/1633 700/260 |
| 2015/0105907 A1 | * | 4/2015 | Aiso ................... | B25J 9/1697 700/259 |

FOREIGN PATENT DOCUMENTS

| | | |
|---|---|---|
| DE | 102008016604 A1 | 10/2009 |
| DE | 102012022190 A1 | 5/2014 |

* cited by examiner

*Primary Examiner* — Stephen Holwerda
(74) *Attorney, Agent, or Firm* — Schmeiser, Olsen & Watts LLP

(57) ABSTRACT

A method for controlling a robot movement of a robot on the basis of a second trajectory is provided, wherein the second trajectory is calculated on the basis of a viscosity volume model.

15 Claims, 4 Drawing Sheets

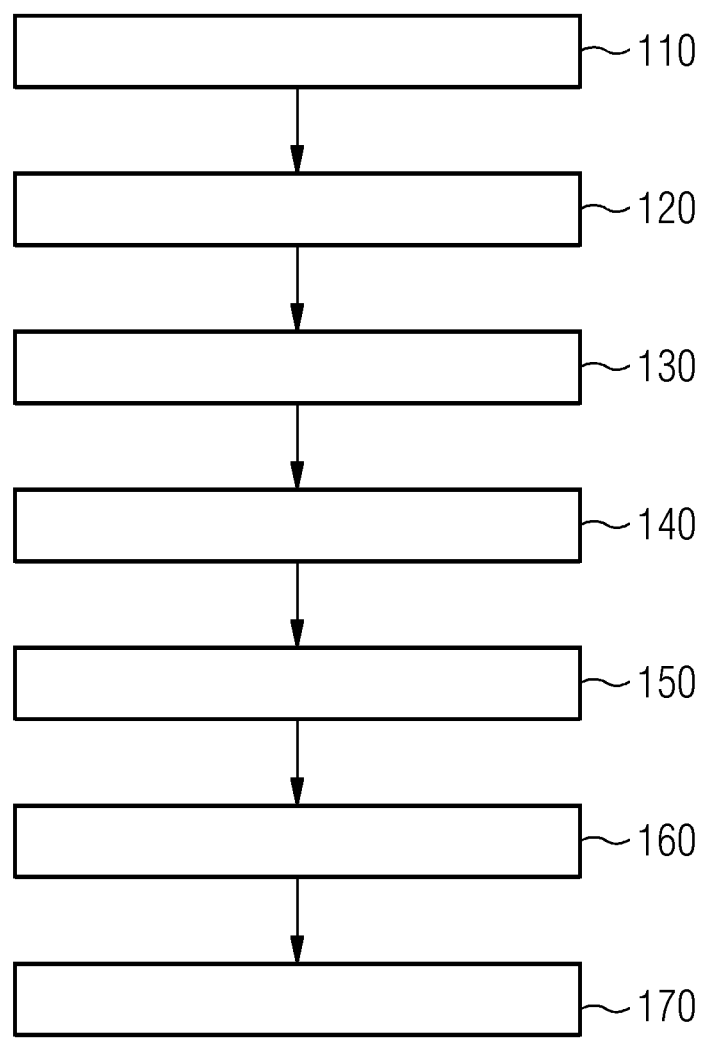

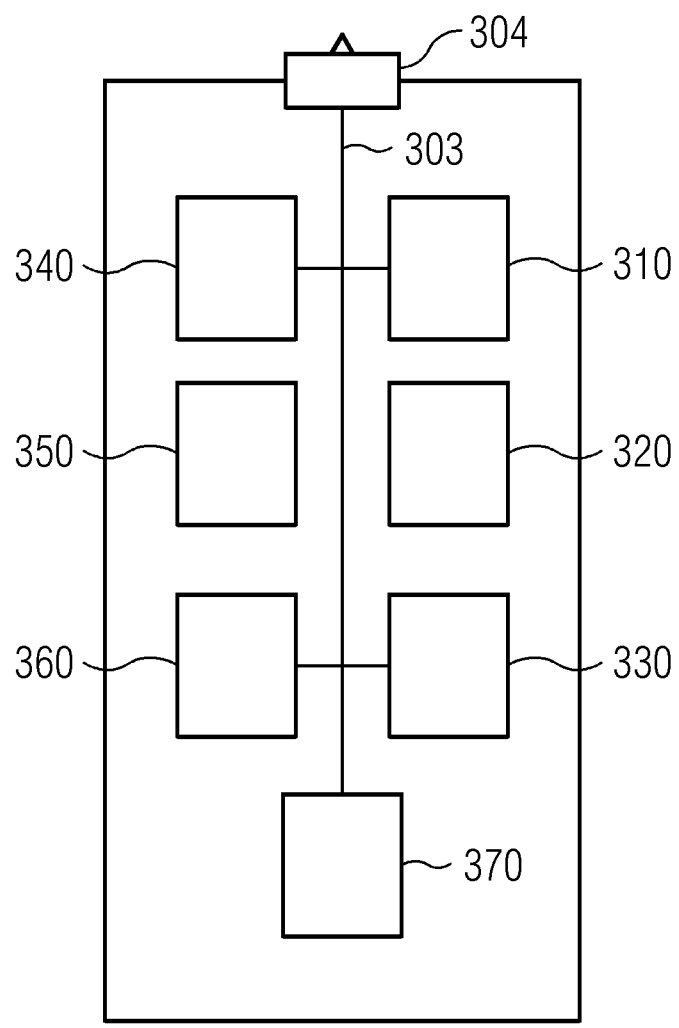

METHOD AND APPARATUS FOR CONTROLLING A ROBOT MOVEMENT OF A ROBOT ON THE BASIS OF A SECOND TRAJECTORY

CROSS-REFERENCE TO RELATED APPLICATIONS

This application claims priority to German application No. 10 2016 212911.2 having a filing date of Jul. 14, 2016, the entire contents of which are hereby incorporated by reference.

FIELD OF TECHNOLOGY

The following relates to a method and an apparatus for controlling a robot movement of a robot on the basis of a second trajectory.

BACKGROUND

It is necessary to find a trajectory in the three-dimensional space for a technical device (for example a robot). The path to be traveled on (trajectory) should be as short as possible and not lead to the technical device colliding with its environment. In addition to the pure geometric movement, further prespecifications for traveling on the path should be made by the trajectory. For example, the permissible speed range of the technical device has to be complied with at all times. In the case of robots, this means that, in the event of a movement of the end effector (for example a pair of welding tongs), the speed of the individual joints also has to lie below a technically prespecified maximum speed. In particular, singularities in the robot position have to be avoided and regions in the vicinity of a singularity have to be traveled through correspondingly slowly. Since, in future, robots will be used in flexible environments (for example industry 4.0 scenarios) and also the tasks to be implemented can vary (individualized production), it is increasingly difficult to check trajectories "manually" in respect of their feasibility.

SUMMARY

An aspect relates to a method and an apparatus which allow a robot movement of a robot to be controlled on the basis of a second trajectory, wherein the second trajectory can be calculated in as simple a manner as possible.

According to a first aspect, embodiments of the invention relates to a method for controlling a robot movement of a robot on the basis of a second trajectory, comprising the following method steps:
a) calculating a viscosity volume model for modeling a first working environment of the robot, wherein
   the viscosity volume model comprises first spatial regions with first different viscosities;
   the first regions are determined on the basis of first characteristics of the robot and of the first working environment;
b) defining a first trajectory for the robot;
c) exciting a simulated liquid in the viscosity volume model to move along the first trajectory, wherein the excited liquid has a flow;
d) detecting a liquid element in the excited liquid at a start of the first trajectory;
e) detecting a covered path of the element in the excited simulated liquid in the viscosity volume model, wherein a flow direction of the simulated liquid through the first regions is determined;
f) storing the covered path as the second trajectory;
g) controlling the robot movement on the basis of the second trajectory.

Unless indicated otherwise in the following description, the terms "carry out", "calculate", "computer-assisted", "compute", "establish", "generate", "configure", "reconstruct" and the like preferably refer to procedures and/or processes and/or processing steps which change and/or generate data and/or convert the data into different data, wherein the data is displayed or can be presented, in particular, as spatial variables, for example as electrical pulses. In particular, the expression "computer" should be interpreted as broadly as possible in order to cover, in particular, all electronic devices with data-processing properties. Computers can therefore be, for example, personal computers, servers, handheld computer systems, pocket PC devices, mobile radio devices and other communication devices which can process data in a computer-assisted manner, processors and other electronic devices for data processing.

In the context of embodiments of the invention, "computer-assisted" can be understood to mean, for example, implementation of the method in which, in particular, a processor executes at least one method step of the method.

In the context of embodiments of the invention, a processor can be understood to mean, for example, a machine or an electronic circuit. A processor may be, in particular, a central processing unit (CPU), a microprocessor or a microcontroller, for example an application-specific integrated circuit or a digital signal processor, possibly in combination with a memory unit for storing program commands etc. A processor may also be, for example, an IC (integrated circuit), in particular an FPGA (field programmable gate array) or an ASIC (application-specific integrated circuit), or a DSP (digital signal processor). A processor can also be understood to mean a virtualized processor or a soft CPU. Said processor may also be, for example, a programmable processor which is equipped with configuration steps for executing said method according to embodiments of the invention or is configured with configuration steps in such a way that the programmable processor implements the inventive features of the method, of the component, of the safety module, or other aspects and partial aspects of embodiments of the invention.

In the context of embodiments of the invention, a "memory unit" can be understood to mean, for example, a memory in the form of a random access memory (RAM) or a hard drive.

In the context of embodiments of the invention, a "working environment", in particular of a robot, can be understood to mean, for example, a movement space of the robot and/or a working space of the robot. The movement space describes, in particular, a space which can be reached, for example, by moving elements of the robot, in particular including the end effector, with the totality of all of the axial movements. In particular, the movement space takes into account, for example, a special form of the end effector and/or of an object to be handled which can be achieved, in particular, with these in the working environment.

In the context of embodiments of the invention, a "first working environment" can be understood to mean, for example, a simplified working environment, a simulation of the real or second working environment or a real model of the second working environment or the actual working environment of the robot. The first working environment can be, in particular, a simplified second working environment in which, for example, certain obstacles are first removed from the (second) working environment. However, in particular, the first working environment can also correspond to the second working environment, depending on the selected scenario.

In the context of embodiments of the invention, a "second working environment" can be understood to mean, for example, an actual or real working environment of the robot. The second working environment can be, in particular, a working location in which the robot is intended to be operated.

The second working environment could also be located, in particular, at a different location at the same time. For example, the operator can control a device (for example a robot or the end effector of a robot) in the first working environment, and the movements of said device can be transmitted, for example, to a preferably identical device (or else a different device for implementing trajectories) in the remote environment (for example second working environment). In particular, it is not necessary for the operator to be aware of any obstacles in the second environment, that is to say he can register a first trajectory, for example in the first working environment, without detailed knowledge about the second working environment. The second trajectory is then matched, for example, to the second working environment, for example, by the methods described in the claims/exemplary embodiments. For example, if a robot were to be controlled, for example, in space from the ground (remote working environment in conjunction with a time delay: existing conditions in the second working environment cannot yet be fully known when defining/registering the first trajectory: for example an obstacle is introduced during the time delay).

In the context of embodiments of the invention, a "working space", in particular of a robot, can be understood to mean, for example, a space which is formed, in particular, by the interfaces and/or movement axes and/or an end effector by, for example, all of the main axes being moved to their respective maximum and minimum position. In particular, the working space is defined independently of the special form of the end effector and/or of the object to be handled (or these aspects are not taken into account in the working space). The movement space is preferably at least as large as the working space, wherein the movement space can also be larger than the working space.

In the context of embodiments of the invention, a "viscosity volume model" can be understood to mean, for example, a computer-assisted or numerical modeling of the working environment of the robot as a fluid-filled/liquid-filled space. Said viscosity volume model can be in the form of, for example, a three-dimensional model which is implemented, in particular, by means of points (for example point clouds), polygons (for example polygon meshes) or voxels (for example voxel grids). The three-dimensional model can describe, for example, positions and/or movements in the viscosity volume model by means of coordinates and (direction) vectors which are defined, in particular, by an x-axis, a y-axis and a z-axis which are orthogonal to one another at an origin. In the context of embodiments of the invention, a "viscosity volume model" can also be understood to mean, for example, an inhomogeneous viscosity volume model with one or more spatial regions which, in particular, each have different viscosities. The respective different regions can be, for example, spatially related voxels of the viscosity volume model.

In the context of embodiments of the invention, an "anisotropic viscosity volume model" can be understood to mean, for example, an extension of the viscosity volume model, wherein, in particular, the viscosities of the viscosity volume model are direction-dependent. For example, the respective viscosities of the one or more different spatial regions differ depending on a movement direction or a direction vector in the respective region. For example, in one region, a first viscosity can take effect in the event of a movement, in particular of a robot, in the x-direction and a second viscosity can take effect in the event of a movement in the y-direction.

In the context of embodiments of the invention, a "model", in particular a viscosity volume model and the like, can be understood to mean, for example, a data structure, in particular for recording data (for example voxels and the like) for modeling the working environment as a fluid-filled space.

In the context of embodiments of the invention, a "module" can be understood to mean, for example, a processor and/or a memory unit for storing program commands. For example, the processor is specially designed to execute the program commands in such a way that the processor executes functions in order to implement the method according to embodiments of the invention or a step of the method according to embodiments of the invention.

In the context of embodiments of the invention, a "trajectory" can be understood to mean, for example, a three-dimensional curve or a path along which a point or an end effector of a robot moves.

In the context of embodiments of the invention, "playback of a trajectory" can be understood to mean, for example, travel on the trajectory by the robot, wherein, in particular, a measurement system detects the second characteristics (for example obstacles and collisions).

In the context of embodiments of the invention, a "measurement system" can be understood to mean, for example, a system for detecting the working environment and/or obstacles in the working environment. The measurement system may be, for example, a 3D camera system or a laser scanner.

In the context of embodiments of the invention, a "robot" can be understood to mean, for example, a medical robot or an industrial robot, it being possible to describe the movements of said robot, in particular, by the Denavit-Hartenberg convention.

In the context of embodiments of the invention, an "infinite" or "approximately infinite" viscosity can be understood to mean, for example, a very high value which, in particular, only permits a scarcely perceptible flow rate. An infinite/approximately infinite viscosity can be established, for example, during implementation in such a way that, in particular, a data field which stores the viscosity is set to the highest permitted value of a data type (for example float, double, integer) of the data field.

In the context of embodiments of the invention, "configurations", in particular of a robot, can be understood to mean, for example, mechanical properties of the robot which indicate, in particular, the possible movements and movement speeds. The configurations of a robot indicate, for example, permissible speeds for mechanisms (for example rotary joints, motors etc.) of the robot for specific points/positions in the working environment of the robot. This gives, for example, the maximum permissible speeds for the robot and/or rotation speeds of the joints of the robot at this point/in this position.

In the context of embodiments of the invention, "characteristics", in particular of a working environment and/or of a robot, can be understood to mean, for example, spatial information about obstacles in the first/second working environment and/or the mechanical properties and/or limitations of the robot. Characteristics also comprise, in particular, information about possible collisions of the robot with obstacles or singularities which can be derived on the basis of the mechanical properties of the robot.

In the context of embodiments of the invention, "first regions", in particular of a viscosity volume model, can be understood to mean, for example, spatial regions which can each have a different viscosity. The first spatial regions can be represented, for example, by points or voxels in the viscosity volume model. The first spatial regions can, for example, also be updated or extended. To this end, a new viscosity can be set in each case, for example, for the first spatial regions or the first spatial regions are extended, for example, by additional spatial regions.

In the context of embodiments of the invention, a "singularity" can be understood to mean, for example, an unfavorable position of the axes. A singularity is characterized and can be identified, for example, by, in particular, two axes of the robot being colinear (in alignment). A typical configuration with a singularity is, for example, the overhead position of the tool/end effector of a six-axis robot. In this case, the first axis and the sixth axis, for example, are in alignment. The controller cannot unambiguously assign, for example, a rotation to be executed about a perpendicular to the first axis or to the sixth axis. A different constellation is given, for example, at the zero crossing of the fifth axis. In this case, in particular, the fourth axis and the sixth axis are in alignment. In this case, there is, in particular, an infinite number of axial positions which lead, in particular, to the same tool position/end effector position or movement paths in which, for example, a plurality of axes would have to be moved toward one another at an infinite speed.

The liquid is preferably excited by the first trajectory in such a way that no turbulence is produced and the flow is therefore preferably a laminar flow.

The first trajectory of the method according to embodiments of the invention can be defined, for example, in the first working environment and/or in a simulated working environment (for example on the basis of a 3D model of the first/second working environment) and/or in the second working environment, for example by means of an input device.

The method is advantageous, for example, to the effect of finding a trajectory (second trajectory) in the three-dimensional space for a technical device (for example a robot). In particular, the trajectory (path to be travelled) can be determined using the method according to embodiments of the invention in such a way that said trajectory is preferably as short as possible and the technical device/end effector of the technical device preferably does not collide with/in its working environment or obstacles in the second working environment. In particular, the method according to embodiments of the invention allows, for example, the permissible speed range of the technical device to be complied with at all times. In the case of robots, it is ensured, for example, that, in the event of a movement of the end effector (for example a pair of welding tongs) of the robot along a trajectory, the speed of the individual joints of the robot also lies below a technically prespecified maximum speed. In particular, singularities in the robot position (position of the joints of the robot) are avoided by virtue of the method according to embodiments of the invention and regions in the vicinity of a singularity are traveled through correspondingly slowly. This is achieved by the method according to embodiments of the invention, for example, by, in particular, regions with singularities being allocated an approximately infinitely high viscosity and regions in the vicinity of singularities being allocated a higher viscosity than regions which are further away from singularities.

Furthermore, the method is advantageous, for example, to the effect of avoiding intervals during travel on a trajectory by an end effector or preventing a sudden rotation of the end effector since, in particular, collisions of the workpiece held by the robot are prevented in this way. The presented method is advantageous, in particular, to the effect of creating, in an automated manner, a trajectory which is, in particular, collision-free and/or avoids singularities.

In a first embodiment of the method, the method comprises an additional method step between method steps b) and c):

b2) updating the viscosity volume model on the basis of second characteristics of a second working environment and of the robot, wherein
the second characteristics are ascertained on the basis of playing back the first trajectory in the second working environment,
the first regions are updated and/or extended on the basis of the second characteristics.

In a further embodiment of the method, the second characteristics are detected on the basis of playing back the first trajectory in the second working environment and a measurement system.

In particular, the second characteristics are detected on the basis of playing back the first trajectory in a simulation of the second working environment and/or a measurement system. Therefore, the second trajectory can be calculated in the second working environment, for example, in a numerical manner.

The method is advantageous, for example, to the effect of identifying obstacles and/or collisions in the second working environment of the robot and allocating a first region with a corresponding viscosity to each of these or updating a first region. To this end, a specific end effector can be used, for example, in the robot in order to track and to measure, in particular, the movement of the robot. To this end, the first trajectory can be manually traveled on by a user, for example, by means of a input device. The user then avoids, for example, obstacles in the working environment of the robot and this deviation can then be detected, for example, by a measurement system in order to ascertain the second characteristics.

In a further embodiment of the method, an input device for defining or playing back the first trajectory has a force feedback means, wherein the second characteristics are detected by means of the force feedback means.

The method is advantageous, for example, to the effect of displaying the viscosity to the user by means of the force feedback means. In particular, the user can be guided around obstacles and singularities as early as during input, so that, for example, the second characteristics can be ascertained in a more simple and/or more rapid and/or more precise manner.

In a further embodiment of the method, the first characteristics of the robot and/or the second characteristics of the robot comprise permissible speeds of the motors and/or permissible rotation ranges of the joints of the robot.

The method is advantageous, for example, to the effect of modeling the properties of a robot with different viscosities. As a result, it is possible to model, for example, a mobility of the robot in its working environment and the technical limits to which this mobility is subject.

In a further embodiment of the method, the first characteristics and/or the second characteristics of the first working environment and/or of the second working environment comprise properties of obstacles, wherein the properties of obstacles comprise, in particular, a size and/or a length and/or a position in the first working environment and/or the second working environment.

In a further embodiment of the method, the first spatial regions with the first different viscosities are defined on the basis of a permissible speed of the robot, wherein the permissible speed is determined, in particular, from configurations of the robot.

To this end, in particular the configurations of the robot, for example in respect of the positions in the first regions in the working environment of the robot in the viscosity volume module (in accordance with a selected spatial resolution), are examined, said configurations in each case giving a maximum permissible speed in particular for these positions. This can be carried out, in particular, on the basis of the first characteristics. If there are a plurality of permissible configurations (for example lefty/righty or elbow up/down) for example for one position, these can be combined, for example, either in a viscosity volume model, for example as a maximum possible speed over all configurations, or a dedicated viscosity volume model is applied for each configuration in order to later have a plurality of action alternatives. The maximum permissible speed is recalculated, for example, by means of a formula into a viscosity at this point. By way of example, the viscosity can be determined as follows: the lower the speed has to be, the higher the viscosity, and vice versa. In this case, the viscosity is selected, in particular, such that, for example, in the event of excitation of the liquid, no turbulence is produced by the first trajectory (preferably only a laminar flow is produced). The speed of the second trajectories which is preferably established as a result is then calibrated to the maximum speed of the device.

In a further embodiment of the method, in the case of a plurality of configurations, in each case one viscosity volume model is calculated for in each case one of the first spatial regions, or the plurality of configurations are combined in the viscosity volume model for the respective first spatial region.

In a further embodiment of the method, the first different viscosities of the viscosity volume model are direction-dependent, wherein the viscosity volume model is, in particular, an anisotropic viscosity volume model.

In a further embodiment of the method, in the case of a change in the second characteristics during playback of the first trajectory and/or in the case of a change in a position of the robot in the second working environment during playback of the first trajectory, the following method steps are repeated:
updating the viscosity volume model;
exciting the simulated liquid;
detecting the liquid element;
detecting further covered paths for one repetition in each case,
wherein the covered path and the further covered paths for the respective repetition update the second trajectory.

The method is advantageous, for example, to the effect of taking into account a movement of the robot or the obstacles during playback of the trajectory when creating the second trajectory.

In a further embodiment of the method, the repetition is repeated in quick succession.

According to a further aspect, embodiments of the invention relates to an apparatus for computer-assisted trajectory calculation for robots, having
a first calculation module for calculating a viscosity volume model for modeling a first working environment of the robot, wherein
the viscosity volume model comprises first spatial regions with first different viscosities;
the first regions are determined on the basis of first characteristics of the robot and of the first working environment;
a first definition module for defining a first trajectory for the first working environment of the robot;
a first excitation module for exciting a simulated liquid in the viscosity volume model for moving along the first trajectory, wherein the excited liquid has a flow;
a first detection module for detecting a liquid element in the excited liquid at a start of the first trajectory;
a second detection module for detecting a covered path of the element in the excited simulated liquid in the viscosity volume model, wherein a flow direction of the simulated liquid through the first regions is determined;
a first memory module for storing the covered path as a second trajectory;
a first control module for controlling the robot movement on the basis of the second trajectory.

In a first embodiment of the apparatus, the apparatus comprises at least one further module for carrying out the method according to the invention of one of the embodiments.

The invention further claims a computer program product having program commands for carrying out said method according to embodiments of the invention, wherein in each case one of the methods according to embodiments of the invention, all of the methods according to embodiments of the invention or a combination of the methods according to embodiments of the invention can be carried out by means of the computer program product.

The invention additionally claims a variant of the computer program product having program commands for the configuration of a creation device, for example a 3D printer or one for creating processors and/or devices, wherein the creation device is configured by the program commands in such a way that said apparatus according to embodiments of the invention is created.

The invention furthermore claims a provision apparatus for storing and/or providing the computer program product. The provision apparatus is, for example, a data carrier which stores and/or provides the computer program product. As an alternative and/or in addition, the provision apparatus is, for example, a network service, a computer system, a server system, in particular a distributed computer system, a cloud-based computer system and/or a virtual computer system which stores and/or provides the computer program product, preferably in the form of a data stream.

Said computer program product is provided, for example, as a download in the form of a program data block and/or command data block, preferably as files, in particular as download files, or as a data stream, in particular as a download data stream, of the complete computer program product. However, said computer program product can, for example, also be provided as a partial download which consists of a plurality of parts and is downloaded, in particular, by means of a peer-to-peer network or is provided as a data stream. A computer program product of this kind is read into a system and executes the program commands, for example, using the provision apparatus in the form of the data carrier, so that the method according to embodiments of the invention is executed on a computer or the creation device is configured in such a way that it creates the apparatus according to embodiments of the invention.

BRIEF DESCRIPTION

Some of the embodiments will be described in detail, with reference to the following figures, wherein like designations denote like members, wherein:

FIG. 1 shows a flowchart of a first exemplary embodiment of the method according to embodiments of the invention;

FIG. 3 shows an apparatus according to embodiments of the invention for controlling a robot movement of a robot on the basis of a second trajectory.

DETAILED DESCRIPTION

Figure 2A:
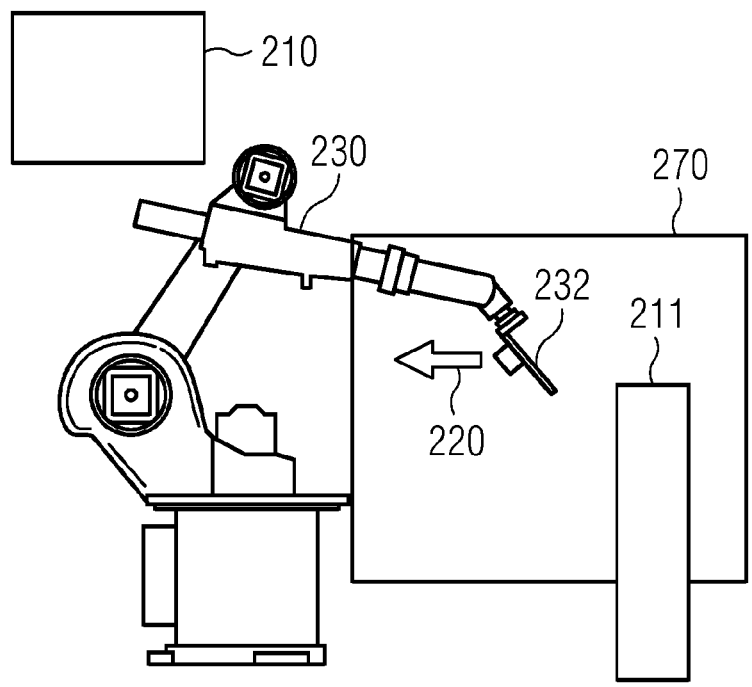
FIG. 2a shows a first exemplary embodiment of the method according to embodiments of the invention for controlling a robot movement, wherein, in particular, obstacles and/or singularities are taken into account.
Figure 2B:
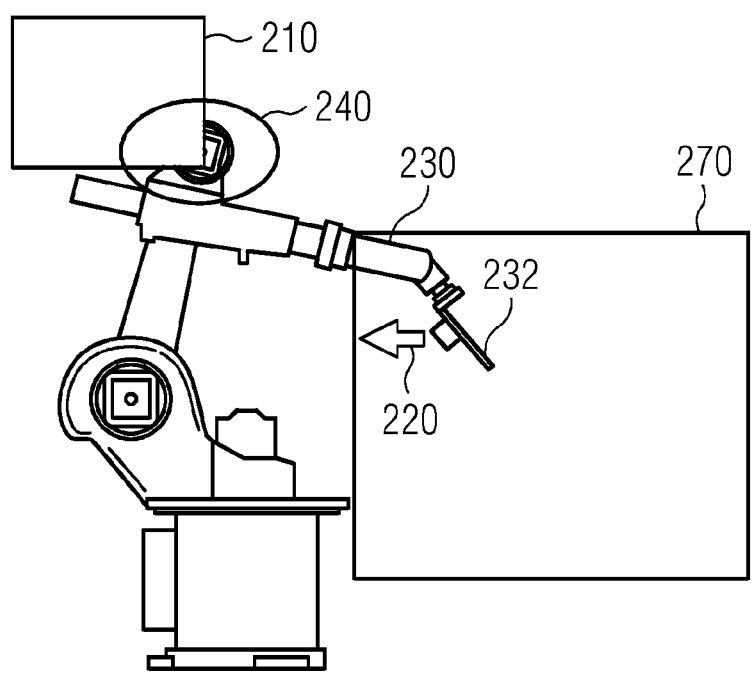
FIG. 2b shows a second exemplary embodiment of the method according to embodiments of the invention for controlling a robot movement, wherein, in particular, obstacles and/or singularities are taken into account.

In the figures, functionally identical elements are provided with the same reference symbols, unless stated otherwise.

The following exemplary embodiments have, unless stated otherwise or already stated, at least one processor and/or one memory device in order to implement or to execute the method.

FIG. 1 shows a flowchart of a first exemplary embodiment of the method according to embodiments of the invention.

Specifically, FIG. 1 shows a method for controlling a robot movement of a robot on the basis of a second trajectory.

The method comprises a first method step for calculating 110 a viscosity volume model for modeling a first working environment of the robot. In this case, the viscosity volume model comprises first spatial regions with first different viscosities, wherein the first regions are determined on the basis of first characteristics of the robot and of the first working environment.

The method comprises a second method step for defining 120 a first trajectory for the robot. The first trajectory can be stored, for example, in a memory unit or a memory module. For example, the first trajectory for the robot can be recorded by an input device or the first trajectory can be prespecified by software (a software component).

In one variant, the method preferably comprises an optional method step for updating the viscosity volume model on the basis of second characteristics of a second working environment and of the robot, wherein the second characteristics are ascertained on the basis of playing back the first trajectory in the second working environment, and the first regions are updated and/or extended on the basis of the second characteristics. Playing back the trajectory in the simulated second working environment can be envisaged as stirring a liquid.

The method comprises a third method step for exciting 130 a simulated liquid in the viscosity volume model for moving along the first trajectory, wherein the excited liquid has a flow, wherein the flow is preferably a laminar flow.

The method comprises a fourth method step for detecting 140 a liquid element/introduced particle in the excited liquid at a start of the first trajectory.

The method comprises a fifth method step for detecting 150 a covered path of the element/particle in the excited simulated liquid in the viscosity volume model, wherein a flow direction of the simulated liquid through the first regions is determined.

The method comprises a sixth method step for storing 160 the covered path as the second trajectory.

The method comprises a seventh method step for controlling 170 the robot movement on the basis of the second trajectory.

In other words, the first working environment of the robot is, in particular initially, modeled and simulated as a liquid-filled space in the form of the viscosity volume model by means of the method according to embodiments of the invention. To this end, the working space of the robot is, for example, initially determined. To this end, the robot can be placed, for example, into the first working environment. The first characteristics can then be determined, for example, on the basis of at least one of the following three steps (or a combination of the three steps) and in order to calculate the viscosity volume model on the basis of the first characteristics, wherein, for example, FIGS. 2a-2d show the corresponding steps.

For example, first obstacles 211 (FIG. 2a) which are already located in the working space 270 are initially detected. For the positions or regions of the first obstacles 211 in the working space, corresponding positions or the corresponding regions are, for example, likewise modeled as the first regions with different viscosities 260. For the outer first region 265 which surrounds the first obstacle 211, a fifth, relatively low, viscosity 265 is initially defined for example. The region of the first obstacle is then surrounded by a higher sixth viscosity 267. The region of the first obstacle 211 and/or an additional freely selected safety distance are/is then set, for example, to an infinitely high viscosity (a seventh viscosity 266). The different regions are then preferably modeled in the viscosity volume model as the first regions with the different viscosities. The safety distance can be modeled, for example, as a flowing transition between the infinite viscosity of the obstacle and the surrounding viscosity.

In particular, possible collisions 240 outside the working space with second obstacles 210 are then ascertained (FIG. 2a and FIG. 2b: for example collisions of the rear robot joints) which can occur, for example, in the event of a planned movement 220 of the robot 230 by way of the end effector 232. These are likewise modeled as first regions with different viscosities 260.

Figure 2C:
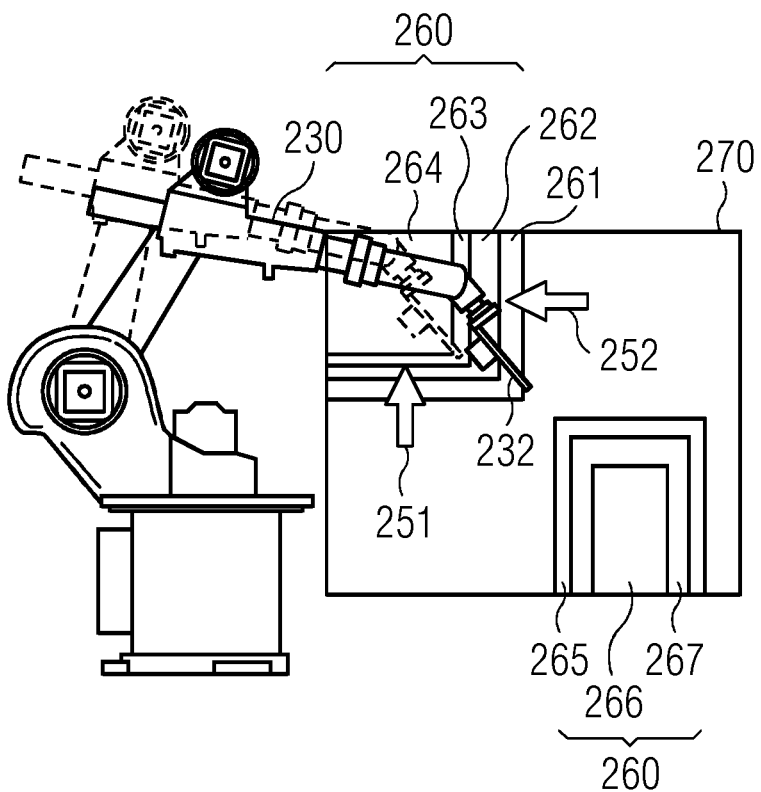
FIG. 2c shows a third exemplary embodiment of the method according to embodiments of the invention for controlling a robot movement, wherein, in particular, obstacles and/or singularities are taken into account.
Figure 2D:
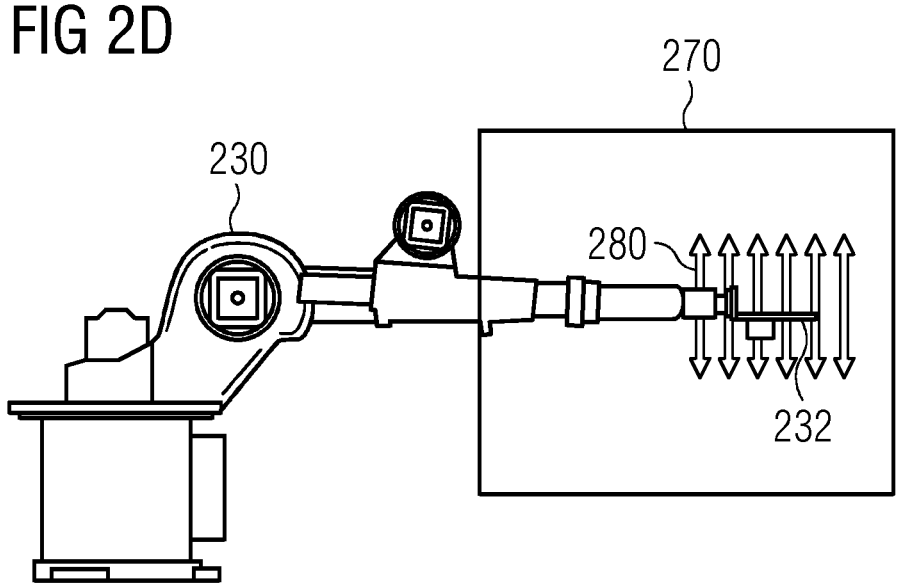
FIG. 2d shows a fourth exemplary embodiment of the method according to embodiments of the invention for controlling a robot movement, wherein, in particular, obstacles and/or singularities are taken into account.

This is shown, for example, in FIG. 2c. The robot moves, for example, to the top left, which is indicated, in particular, by a first direction arrow 251 and a second direction arrow 252. The closer the robot comes to the second obstacle 210, the higher is the viscosity, until said viscosity is infinitely or approximately infinitely high and does not permit any further movement in the direction of the second obstacle. As is illustrated in FIG. 2c, a first viscosity 261 is initially active when the robot is still relatively far away from the second obstacle 210. As the robot 230 approaches the second obstacle 210, a first region, which is situated closer to the second obstacle 210, comprises a second higher viscosity 262. As the robot 230 further approaches the second obstacle 210, further first regions each comprise a third (higher) viscosity 263 and a fourth (even higher) viscosity 264.

It is, for example, also possible for the first regions for the first obstacle 211 and the second obstacle 210 to each be modeled without an increasing viscosity. This can be achieved, in particular, by the first regions for the first obstacle 211 and the second obstacle 210 each being set to an infinitely high viscosity.

In a next step, the singularities are, for example, further modeled by means of anisotropic viscosities for example. This has the effect, in particular, that movements of the end effector 232 in arrow direction 280 are still possible. Movements perpendicular to the arrow direction 280 or out of the plane of the image require a very rapid movement of the joints of the robot 230. These rapid movements, in particular at a high joint speed, can exceed, for example, the mechanical load-bearing ability of components of the robot. Limiting of the speed can be modeled, for example, by anisotropic viscosities in the first regions. In other words, this means that a low viscosity prevails in the arrow direction 280 preferably at the same location, otherwise a very high viscosity is established in the viscosity volume model.

The individual steps can be calculated, for example, in each case as a dedicated viscosity volume model and can be combined to form one viscosity volume model at the end. As an alternative, it is possible, for example, for all of these steps to be calculated in one viscosity volume model which updates the viscosity volume model for each step.

After the viscosity volume model has been calculated, it can be updated, for example, on the basis of the second characteristics of the second working environment. Here, for example, the first trajectory which has been recorded somewhere, for example from a scale model or in the first working environment, can be transmitted to the second working environment, for example a production hall. Additional obstacles or possible further singularities are detected, for example, by means of a measurement system and modeled in the viscosity volume model. To this end, the first spatial regions can, for example, be updated or further first spatial regions can be added, for which a viscosity is established, in particular, in the viscosity volume model in each case.

In order to now calculate the second trajectory, the first trajectory is, for example, placed into the calculated viscosity volume model and, in particular, a fluid simulation (simulated liquid) is started. The first trajectory is now used in order to excite ("to stir") the simulated liquid in the viscosity volume model. The viscosity is not taken into consideration in this process, however the viscosities are relevant, in particular, for the movement of the liquid (flow) which is now established (that is to say is calculated by the simulation).

Shortly after the start of excitation (stirring), a liquid element is detected/or a particle is introduced into the flow. The liquid element can be, for example, marked or a liquid element in the form of a particle is used, wherein the particle is inserted, for example, into the simulated liquid. Detection of the liquid element (or its covered path) begins where the transmitted or first trajectory begins. On account of the viscosity and the fluid movement calculated with it, the liquid element now moves around obstacles (that is to say in the first regions with a high viscosity) and avoids singularities or moves at the desired speed. The new, collision-free trajectory (second trajectory) which describes the liquid element is now transmitted to the robot in the second working environment in order to control movement of said robot.

In other words, obstacles of the first working environment can initially be modeled, in particular, by means of the viscosity volume model by means of the viscosities in the first spatial regions of the viscosity volume model, wherein the viscosity (viscosities) of the viscosity volume model are preferably spatially variable. The viscosities of the viscosity volume model can preferably be fed back directly to a user when traveling on a trajectory (first trajectory or second trajectory). This can be performed, for example, by means of an input device which has, for example, a haptic force feedback means.

By way of these input devices, the user can, for example, feel forces and different viscosities can be presented. In addition, these input devices preferably provide a good way of being able to input trajectories in a simple manner. A corresponding input device is therefore used, for example, for defining the first trajectory and/or playing back the first trajectory.

In addition, a measurement system for example can be used in order to detect the second characteristics. The second characteristics can be ascertained, for example, for the second working environment, in particular for obstacles in the second working environment. The measurement system may be, for example, a 3D camera system or a laser scanner. In addition, the measurement system can have, for example, control modules in order to drive the robots such that they travel on a trajectory. The measurement system is preferably able to detect states, for example configurations and/or positions, from the robot. This can be performed, for example, by reading out configurations and run time data of the robot via a data interface of the robot. This data is ultimately combined by a central computer unit, for example a processor, in the viscosity volume model which is stored, for example, in a data memory/memory unit, preferably in the form of the first regions and the different viscosities.

The method according to embodiments of the invention can preferably be used to generate trajectories which are both collision-free and avoid singularities. To this end, for example in a further variant, a memory unit for recording the viscosity volume model can initially be prepared in a preprocessing step. To this end, the configurations of the robot are examined preferably in respect of all positions or points in the working environment of the robot in the viscosity volume model (depending on the selected spatial resolution). The examined configurations show, for example, the maximum permissible speeds for the robot, for example rotation speeds of the joints of the robot, at this point/this position. If there are a plurality of permissible configurations (for example lefty/righty or elbow up/down) for a point/a position, these can be combined, for example, in the viscosity volume model (for example maximum possible speed over all configurations) or a dedicated viscosity volume model is applied for each configuration in order to have a plurality of action alternatives later in particular. The maximum permissible speed is then converted, for example using a formula, into a viscosity at this point/position.

In the event of a collision (either of the end effector of the robot or of the joints of the robot), the viscosity is set to be infinite or approximately infinite. When implemented as a software component, this can be achieved, for example, by setting a data type, for example a double value, to the maximum permissible value. In this way, it is possible, for example, for singularities to be modeled.

In one variant, it is possible, for example, for an anisotropic viscosity to be used. In particular, direction-dependent speed restrictions can also be modeled with said anisotropic viscosity. Therefore, for example, an industrial robot with an almost outstretched arm can still travel only very slowly in the direction of extent since a high viscosity has been defined in the viscosity volume model for this direction in one region. Perpendicular movements can still be executed, for example, at a high speed since a low viscosity has been defined for this direction in the corresponding first region. Corresponding mathematical simulation models for anisotropic viscosity are used, for example, in geology.

The prevailing viscosity between the points/positions under consideration can be interpolated for example. This does not apply, in particular, in the general case of singularities. Singularities are preferably determined in advance from the mechanics of the robot and the corresponding points/positions are explicitly calculated and, in particular, taken into account in the first characteristics, for example stored in first characteristics.

As soon as the viscosity volume model is calculated, for example the first trajectory for the robot can be received by an input device or the first trajectory can be prespecified by software. The parameters of the first trajectory, for example positions and speeds, are stored (for example in the memory unit).

The second characteristics are ascertained, for example, by playing back the trajectory in a new environment or the actual/second working environment of the robot. To this end, new obstacles which are identified using the measurement system are, for example, initially taken into account in the second characteristics. In particular, the viscosity volume model is updated by means of the second characteristics.

In a further variant, the collision points and singularities can also be updated (that is to say first characteristics and/or the second characteristics) if, in a dynamic scenario, the robot itself has moved, for example on a navigable platform. The viscosity volume model is then updated, in particular, on the basis of the first characteristics and/or the second characteristics.

After the updating process, a simulated liquid is then excited in the viscosity volume model through the first trajectory, wherein the liquid has a flow—that is to say flows in one direction—after the excitation. After a suitable time interval, an element is then, for example, detected in the liquid at the start of the first trajectory. To this end, a particle can, for example, be inserted into the excited simulated liquid. The position of the element is tracked and interpreted as movement of the end effector. Whereas excitation of the liquid by means of the first trajectory can theoretically take place through obstacles (the viscosity is not taken into consideration in this case), the element preferably always follows a path which does not have any collisions with forbidden zones (infinitely high viscosity or approximately infinitely high viscosity) and also takes place at the speed prespecified by the viscosity. The calculations required for this purpose are afforded, for example, by the fundamental fluid mechanics.

In a further preferred variant, the viscosity is dependent on a distance from an obstacle or a singularity.

In a further preferred variant, the respective viscosity which is defined by an obstacle and/or singularity, increases depending on a distance from the obstacle and/or singularity. In other words, the respective first region comprises a high viscosity for a position close to the obstacle and/or singularity and a lower viscosity for a position which is further away from the obstacle and/or singularity. In particular, the viscosity can be increased in steps the closer a position/point in to the obstacle and/or singularity.

In a further preferred variant, a processor is specially designed to execute program commands in such a way that the processor executes functions in order to implement the method according to embodiments of the invention or at least one of the steps of the method according to embodiments of the invention.

FIG. 3 shows an apparatus according to embodiments of the invention for controlling a robot movement of a robot on the basis of a second trajectory.

Specifically, FIG. 3 shows an apparatus for computer-assisted trajectory calculation for robots. The apparatus comprises a first calculation module 310, a first definition module 320, an optional first update module (not illustrated), a first excitation module 330, a first detection module 340, a second detection module 350, a first memory module 360, a first control module 370 and an optional communications interface 304 which are connected to one another by means of a bus 303 such that they communicate.

The first calculation module 310 is designed to calculate a viscosity volume model for modeling a first working environment of the robot, wherein the viscosity volume model comprises first spatial regions with first different viscosities, and the first regions are determined on the basis of first characteristics of the robot and the first working environment.

The first calculation module 310 can be implemented, for example, by means of a processor and a first program component which calculate the viscosity volume model by means of program commands.

The first definition module 320 is designed to define a first trajectory for the first working environment of the robot. The definition module 320 can be, for example, an input device, as has been described, for example, in FIG. 1.

The first update module is designed to update the viscosity volume model on the basis of second characteristics of a second working environment and the robot, wherein the second characteristics are ascertained on the basis of playback of the first trajectory in the second working environment. During the updating process, the first regions are updated and/or extended on the basis of the second characteristics.

The first update module can be implemented, for example, by means of the processor, a second program component and the measurement system explained in FIG. 1, wherein the viscosity volume model is updated by means of program commands and the first characteristics and/or second characteristics.

The first excitation module 330 is designed to excite a simulated liquid in the viscosity volume model to move along the first trajectory, wherein the excited liquid has a flow.

The first excitation module 330 can be implemented, for example, by means of the processor and a third program component which calculate the excitation of the simulated liquid by means of program commands.

The first detection module 340 is designed to detect a liquid element in the excited liquid at a start of the first trajectory.

The first detection module 340 can be implemented, for example, by means of the processor and a fourth program component which mark the liquid element by means of program commands in such a way that said liquid element can be taken into consideration.

The second detection module 350 is designed to detect a covered path of the element in the excited simulated liquid in the viscosity volume model, wherein a flow direction of the simulated liquid through the first regions is determined.

The second detection module 350 can be implemented, for example, by means of the processor and a fifth program component which track the movement of the liquid element in the simulated liquid by means of program commands.

The first memory module 360 is designed to store the covered path as the second trajectory. The first memory module 360 can be, for example, a hard drive, a USB memory or an SSD hard drive.

The first control module 370 is designed to control the robot movement on the basis of the second trajectory.

The first control module 370 can be implemented, for example, by means of the processor and a sixth program component which control the robot movement by means of program commands.

The apparatus can, for example, additionally further comprise (at least one) further component/components such as, for example, a processor, a memory unit, an input device, in particular a computer keyboard or a computer mouse, and a monitor.

Although the invention has been illustrated and described in more detail by the preferred exemplary embodiments, the invention is not restricted by the disclosed examples and other variations can be derived therefrom by a person skilled in the art without departing from the scope of protection of the invention.

The invention claimed is:

1. A method for controlling a robot movement of a robot on a basis of a second trajectory, the method comprising:
   a) calculating a viscosity volume model for modeling a first working environment of the robot, wherein the viscosity volume model comprises first spatial regions with first different viscosities, the first spatial regions are determined on a basis of first characteristics of the robot and of the first working environment;
   b) defining a first trajectory for the robot;
   c) exciting a simulated liquid in the viscosity volume model to move along the first trajectory, wherein the excited liquid has a flow;
   d) detecting a liquid element in the excited simulated liquid at a start of the first trajectory;
   e) detecting a covered path of the liquid element in the excited simulated liquid in the viscosity volume model, wherein a flow direction of the excited simulated liquid through the first spatial regions is determined;
   f) storing the covered path as the second trajectory; and
   g) controlling the robot movement on the basis of the second trajectory.

2. The method as claimed in claim 1, further comprising, between step b) and step c):
   b2) updating the viscosity volume model on a basis of second characteristics of a second working environment and of the robot, wherein the second characteristics are ascertained on a basis of playing back the first trajectory in the second working environment, and the first spatial regions are updated and/or extended on the basis of the second characteristics.

3. The method as claimed in claim 2, wherein the second characteristics are detected on the basis of playing back the first trajectory in the second working environment and a measurement system.

4. The method as claimed in claim 1, wherein an input device for defining or playing back the first trajectory has a force feedback means, wherein the second characteristics are detected by means of the force feedback means.

5. The method as claimed in claim 1, wherein the first characteristics of the robot and/or the second characteristics of the robot comprise permissible speeds of the motors and/or permissible rotation ranges of the joints of the robot.

6. The method as claimed in claim 1, wherein the first characteristics and/or the second characteristics of the first working environment and/or of the second working environment comprise properties of obstacles, wherein the properties of obstacles comprise a size and/or a length and/or a position in the first working environment and/or the second working environment.

7. The method as claimed in claim 1, wherein the first spatial regions with the first different viscosities are defined on a basis of a permissible speed of the robot, wherein the permissible speed is determined from configurations of the robot.

8. The method as claimed in claim 7, wherein, in a case of a plurality of configurations, in each case one viscosity volume model is calculated for in each case one of the first spatial regions, or the plurality of configurations are combined in the viscosity volume model for the respective first spatial region.

9. The method according to claim 1, wherein the first different viscosities of the viscosity volume model are direction-dependent, wherein the viscosity volume model is an anisotropic viscosity volume model.

10. The method as claimed in claim 2, wherein, in the case of a change in the second characteristics during playback of the first trajectory and/or in a position of the robot in the second working environment during playback of the first trajectory, the following method steps are repeated:
    updating the viscosity volume model;
    exciting the simulated liquid;
    detecting the liquid element;
    detecting further covered paths for one repetition in each case,
       wherein the covered path and the further covered paths for the respective repetition are combined as a second trajectory and are stored.

11. The method as claimed in claim 10, wherein the repetition is repeated in succession.

12. A computer program product having program commands, that when executed, implements the method as claimed in claim 1.

13. A provision apparatus that stores and/or provides the computer program product as claimed in claim 12.

14. An apparatus for controlling a robot movement of a robot on a basis of a second trajectory, comprising:
    a first calculation module for calculating a viscosity volume model for modeling a first working environment of the robot, wherein the viscosity volume model comprises first spatial regions with first different viscosities, the first spatial regions being determined on a basis of first characteristics of the robot and of the first working environment;
    a first definition module for defining a first trajectory for the robot;

a first excitation module for exciting a simulated liquid in the viscosity volume model for moving along the first trajectory, wherein the excited simulated liquid has a flow;

a first detection module for detecting a liquid element in the excited simulated liquid at a start of the first trajectory;

a second detection module for detecting a covered path of the liquid element in the excited simulated liquid in the viscosity volume model, wherein a flow direction of the excited simulated liquid through the first spatial regions is determined;

a first memory module for storing the covered path as a second trajectory; and a first control module for controlling the robot movement on the basis of the second trajectory.

15. A computer program product having program commands to configure a creation device that creates the apparatus as claimed in claim 14.

* * * * *